US010999891B2

(12) United States Patent
Kim et al.

(10) Patent No.: US 10,999,891 B2
(45) Date of Patent: May 4, 2021

(54) METHOD FOR COMMUNICATING IN MULTI-MAC-OPERATING ENVIRONMENT AND IOT APPARATUS

(71) Applicant: ELECTRONICS AND TELECOMMUNICATIONS RESEARCH INSTITUTE, Daejeon (KR)

(72) Inventors: Kyeong-Tae Kim, Daejeon (KR); Jeong-Nyeo Kim, Daejeon (KR); Seon-Gyoung Sohn, Daejeon (KR); Yun-Kyung Lee, Daejeon (KR); Jae-Deok Lim, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 23 days.

(21) Appl. No.: 16/553,606

(22) Filed: Aug. 28, 2019

(65) Prior Publication Data

US 2020/0187296 A1   Jun. 11, 2020

(30) Foreign Application Priority Data

Dec. 7, 2018   (KR) .......................... 10-2018-0157605

(51) Int. Cl.
*H04W 80/02*      (2009.01)
*H04W 52/28*      (2009.01)
(Continued)

(52) U.S. Cl.
CPC ............. *H04W 80/02* (2013.01); *H04W 4/70* (2018.02); *H04W 52/0216* (2013.01); *H04W 52/288* (2013.01)

(58) Field of Classification Search
CPC ............... H04W 80/02; H04W 52/288; H04W 52/0216; H04W 4/70; H04W 74/002;
(Continued)

(56) References Cited

U.S. PATENT DOCUMENTS 9,439,188 B2 *   9/2016   Jafarian ............ H04W 52/0216
2008/0108355 A1 *   5/2008   Oleszcsuk ......... H04W 72/1263
455/442

(Continued)

FOREIGN PATENT DOCUMENTS

KR   10-1679331 B1   11/2016
KR   10-2018-0067786 A   6/2018

OTHER PUBLICATIONS

"An Industrial IoT MAC Protocol Based on IEEE 802.15.4e TSCH for a Large-Scale Network"; Kim et al.; ICACT Feb. 19-22, 2017 (Year: 2017).*

(Continued)

*Primary Examiner* — Benjamin H Elliott, IV
(74) *Attorney, Agent, or Firm* — LRK Patent Law Firm

(57) ABSTRACT

A communication method and an IoT device in a multi-MAC (Media Access Control)-operating environment. The communication method in the multi-MAC-operating environment, including synchronous MAC and asynchronous MAC, includes periodically transmitting, by the IoT device included in the multi-MAC-operating environment, a first message to a first device; determining, by the IoT device, whether to transmit a second message; transmitting, by the IoT device, a preamble packet to a second device, to which the second message is to be transmitted, when the second message is determined to be transmitted; and transmitting, by the IoT device, the second message to the second device.

19 Claims, 11 Drawing Sheets

(51) Int. Cl.
*H04W 52/02* (2009.01)
*H04W 4/70* (2018.01)

(58) Field of Classification Search
CPC . H04W 74/02; H04W 74/04; H04W 74/0825; H04W 52/0225; Y02D 30/70
See application file for complete search history.

(56) References Cited

U.S. PATENT DOCUMENTS

| | | | |
|---|---|---|---|
| 2010/0150043 A1* | 6/2010 | Kim | H04W 52/0235 370/311 |
| 2010/0182987 A1* | 7/2010 | Shin | H04W 74/0816 370/338 |
| 2011/0069656 A1* | 3/2011 | Choi | H04B 7/2656 370/328 |
| 2011/0176465 A1* | 7/2011 | Panta | H04W 52/0235 370/311 |
| 2012/0087297 A1* | 4/2012 | Park | H04W 40/00 370/315 |
| 2012/0207062 A1* | 8/2012 | Corbellini | H04W 74/08 370/256 |
| 2013/0101058 A1* | 4/2013 | Hummel | H04J 3/047 375/259 |
| 2013/0195082 A1* | 8/2013 | Wu | H04W 74/0808 370/336 |
| 2014/0044037 A1* | 2/2014 | Park | H04W 74/08 370/315 |
| 2015/0036570 A1* | 2/2015 | Jeong | H04W 52/0216 370/311 |
| 2015/0381518 A1* | 12/2015 | Lee | H04L 45/566 370/349 |
| 2016/0134436 A1* | 5/2016 | Yu | H04L 12/6418 370/337 |
| 2017/0279688 A1* | 9/2017 | Shao | H04L 67/12 |
| 2018/0146497 A1* | 5/2018 | Jeong | H04W 4/70 |
| 2018/0197140 A1* | 7/2018 | Goja | G07C 9/00896 |
| 2018/0279224 A1* | 9/2018 | Yang | H04W 52/028 |
| 2019/0208549 A1* | 7/2019 | Zhang | H04W 74/0833 |
| 2020/0015268 A1* | 1/2020 | Zhang | H04W 74/04 |
| 2020/0187296 A1* | 6/2020 | Kim | H04W 4/70 |

OTHER PUBLICATIONS

Wei Ye et al., "An Energy-Efficient MAC Protocol for Wireless Sensor Networks," Proceedings. Twenty-First Annual Joint Conference of the IEEE Computer and Communications Societies, 2002.
Michael Buettner et al., "X-MAC: A Short Preamble MAC Protocol for Duty-Cycled Wireless Sensor Networks," Proceedings of the 4th International Conference on Embedded Networked Sensor Systems, SenSys 2006, Boulder, Colorado, USA, Oct. 31-Nov. 3, 2006.
IEEE Standard for Local and metropolitan area networks, Part 15A: Low-Rate Wireless Personal Area Networks (LR-WPANs), Amendment 1: MAC sublayer, IEEE Std 802.15.4e™-2012, Apr. 16, 2012.

* cited by examiner

METHOD FOR COMMUNICATING IN MULTI-MAC-OPERATING ENVIRONMENT AND IOT APPARATUS

CROSS REFERENCE TO RELATED APPLICATION

This application claims the benefit of Korean Patent Application No. 10-2018-0157605, filed Dec. 7, 2018, which is hereby incorporated by reference in its entirety into this application.

BACKGROUND OF THE INVENTION

1. Technical Field

The present invention relates generally to communication technology for IoT devices in a multi-MAC (Media Access Control)-operating environment, and more particularly to multi-MAC-operating technology for avoiding packet collisions and minimizing a duty cycle.

2. Description of Related Art

In the industrial IoT service, there is strong demand for support of lightweight network stack, which guarantees low energy consumption and a high data transmission rate with limited system resources. Particularly, a method for configuring a wireless network, the stability of which is maintained for a long time, by stably transmitting data such that the failure rate is less than 0.1% in a noisy wireless network environment while minimizing the amount of power consumed for data transmission is required.

The IEEE 802.15.4 standard, which is proposed for low-power, low-cost and short-range wireless networks, has issues such as transmission delay, limited reliability, problems pertaining to peer-to-peer communication, lack of a low-power management method for meeting various QoS requirements, and the like. In order to solve the problems with the existing IEEE 802.15.4 technology and to satisfy requirements such as a communication range longer than 1 km, reliable communication in a shadow area, low energy consumption for battery life longer than ten years, minimum infrastructure, and the like, standards such as Weightless v.1.0, IEEE 802.15.4e, g, and k, and the like have been recently established in consideration of the requirements of ITU-R M.2002/M.2004, and the like. Also, standards including IEEE 802.15.4m, 15.8, and the like are under discussion.

In IEEE 802.15.4e, a Media Access Control (MAC) template for transmitting and receiving data using Time-Slotted Channel Hopping (TSCH) is standardized, but a scheduling algorithm for allocating a timeslot and a frequency channel to be used in order for each node to communicate with the upper-level node thereof in a periodically repeated cycle is not specified. Accordingly, the 6TiSCH working group of IETF has been researching TSCH-based communication scheduling since 2013 and has proposed a 6top protocol for two-way scheduling negotiation that is currently in draft form. However, in order to satisfy various QoS requirements of IoT service (high reliability and very low energy consumption) when using more than 100 industrial IoT devices, it is necessary to develop multi-MAC-operating technology for preventing packet collisions and minimizing a duty cycle.

SUMMARY OF THE INVENTION

An object of the present invention is to prevent packet collisions and interference in a large-scale IoT environment and to satisfy various QoS requirements of industrial IoT.

Another object of the present invention is to provide multi-MAC-operating technology, which may prevent packet collisions and minimize a duty cycle.

A further object of the present invention is to separately transmit control messages and data messages through simultaneous operation of synchronous MAC and asynchronous MAC, thereby completely preventing packet collisions and maximizing the success rate of data transmission.

Yet another object of the present invention is to enter and maintain a sleep mode, excluding a time section in which data is transmitted, thereby minimizing a duty cycle and maximizing energy efficiency.

Still another object of the present invention is to transmit a control message by an on-demand scheme without any scheduling negotiation and to enter and maintain a sleep mode, excluding the time section in which the control message is transmitted, thereby performing interference-free communication scheduling and reducing energy consumption.

In order to accomplish the above objects, a communication method in a multi-MAC (Media Access Control)-operating environment, including synchronous MAC and asynchronous MAC, according to the present invention may include periodically transmitting, by an IoT device included in the multi-MAC-operating environment, a first message to a first device; determining, by the IoT device, whether to transmit a second message; transmitting, by the IoT device, a preamble packet to a second device, to which the second message is to be transmitted, when the second message is determined to be transmitted; and transmitting, by the IoT device, the second message to the second device.

Here, the periodically transmitting the first message may include transmitting, the IoT device, the first message to the first device, which is the upper-level node of the IoT device, using a synchronous MAC protocol.

Here, the periodically transmitting the first message may include transmitting the first message, which is a data message, to the first device using the synchronous MAC protocol.

Here, the IoT device may enter a sleep mode after transmitting the first message using the synchronous MAC protocol.

Here, the transmitting the second message may include transmitting, by the IoT device, the second message to the second device, which is a lower-level node of the IoT device, using an asynchronous MAC protocol.

Here, the transmitting the second message may include transmitting the second message, which is a control message, to the second device using the asynchronous MAC protocol.

Here, the transmitting the preamble packet to the second device may include transmitting the preamble packet having information about wakeup timing of the second device, to the second device, which periodically samples a channel.

Here, the transmitting the second message may include transmitting the second message to the second device at a time corresponding to the wakeup timing.

Here, the IoT device may transmit a message, including at least one of the first message and the second message, based on multi-MAC-scheduling information in which at least one of a timeslot or a frequency channel is specified.

Here, in the event of a packet collision between a message transmitted by the IoT device and a message transmitted by a neighboring IoT device, which shares the timeslot and the frequency channel with the IoT device, at least one of the message transmitted by the IoT device and the message transmitted by the neighboring IoT device may be transmitted after a time delay.

Here, the communication method may further include receiving, by the IoT device, a control message from the first device using an asynchronous MAC protocol.

Here, the receiving the control message may include receiving, by the IoT device, a preamble packet from the first device; changing, by the IoT device, to a wakeup mode at a time corresponding to the preamble packet; and receiving, by the IoT device, the control message in the wakeup mode.

Here, the changing to the wakeup mode may include maintaining a sleep mode until wakeup timing corresponding to the preamble packet and to change to the wakeup mode at the wakeup timing.

Here, the communication method may further include periodically receiving, by the IoT device, a data message from the second device using a synchronous MAC protocol.

Also, an IoT device for performing communication in a multi-MAC (Media Access Control)-operating environment, including synchronous MAC and asynchronous MAC, according to an embodiment of the present invention may include a message generation unit configured to generate a message, including at least one of a first message to be transmitted to a first device and a second message to be transmitted to a second device; and a communication unit configured to transmit the first message to the first device using a synchronous MAC protocol when the generated message is the first message and transmit the second message to the second device using an asynchronous MAC protocol when the generated message is the second message.

Here, the first message, which is transmitted using the synchronous MAC protocol, may be a data message, and the second message, which is transmitted using the asynchronous MAC protocol, may be a control message.

Here, the IoT device may further include a power-saving management unit configured to enter a sleep mode after transmission of the first message and maintaining the sleep mode during a preset period.

Here, when the generated message is the second message, the communication unit may transmit a preamble packet to the second device and transmit the second message to the second device at a time corresponding to the preamble packet.

Here, after reception of the preamble packet, the second device may maintain a sleep mode for a time period corresponding to the preamble packet and then receive the second message.

Here, the IoT device may further include a scheduling unit configured to manage multi-MAC-scheduling information for transmitting the message, and the power-saving management unit may set the sleep mode or a wakeup mode based on the multi-MAC-scheduling information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
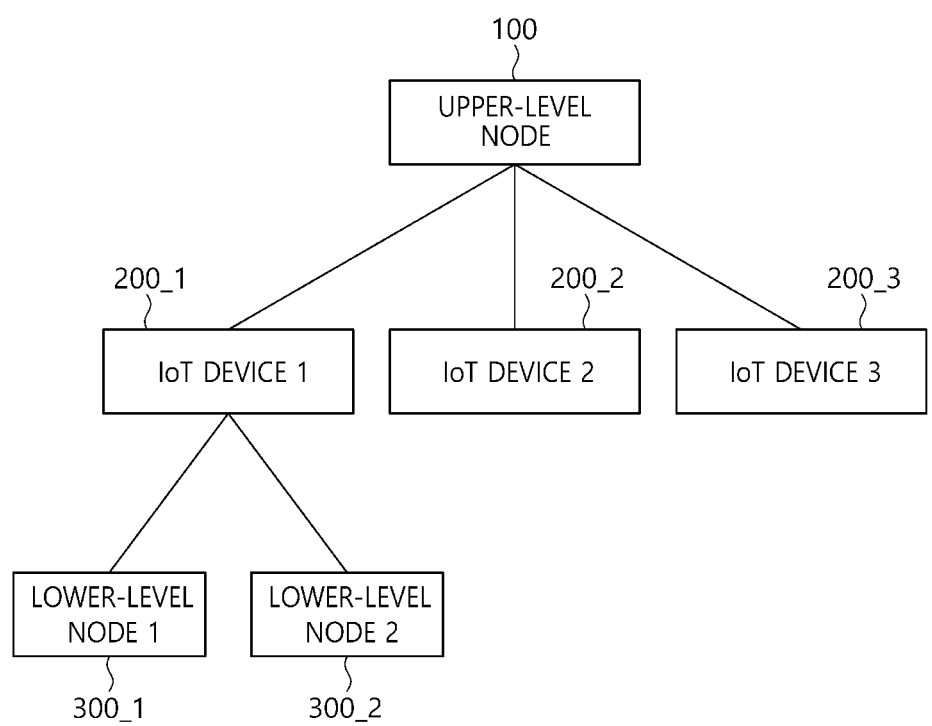
FIG. 1 is a view that schematically shows a system in which an IoT device in a multi-MAC-operating environment according to an embodiment of the present invention is applied.

The present invention may be variously changed and may have various embodiments, of which specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, a preferred embodiment of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows a system in which an IoT device in a multi-MAC-operating environment according to an embodiment of the present invention is applied.

As illustrated in FIG. 1, the multi-MAC-operating environment may be applied to an IoT system that includes at least one of an upper-level node 100, an IoT device 200, and a lower-level node 300.

First, the upper-level node 100, which is the parent node of the IoT device 200, may transmit control messages to one or more IoT devices 200, which are the child nodes thereof, or may receive data messages therefrom.

Here, the upper-level node 100 may non-periodically transmit a control message to the IoT device 200 in order to deliver network management information and a control command thereto. Also, the upper-level node 100 may periodically receive a data message from the IoT device 200.

The IoT device 200 may periodically transmit a data message to the upper-level node 100 and non-periodically receive a control message therefrom. Also, when the IoT system includes a node 300 at the level that is lower than that of the IoT device 200, the IoT device 200 may non-periodically transmit a control message to the lower-level node 300 and periodically receive a data message therefrom.

Finally, the lower-level node 300, which is a child node of the IoT device 200, may transmit a data message to the IoT device 200 or receive a control message therefrom.

For the convenience of description, the terms 'upper-level node' and 'lower-level node' are used. However, in an actual IoT system, the upper-level node 100 and the lower-level node 300 may be individual devices that configure the IoT system, like the IoT device 200.

In the multi-MAC-operating environment according to an embodiment of the present invention, each of the upper-level node 100 and the IoT device 200 may transmit a control message to the child nodes thereof using asynchronous MAC. Also, each of the IoT device 200 and the lower-level node 300 may transmit a data message to the parent node thereof using synchronous MAC.

As described above, because a data message and a control message are separately transmitted by simultaneously operating synchronous MAC and asynchronous MAC, the number of packet collisions may be minimized, whereby the success rate of data transmission may be maximized. Also, a sleep mode is set during a period in which data communication is not performed, whereby energy consumption may be minimized.

Figure 2:
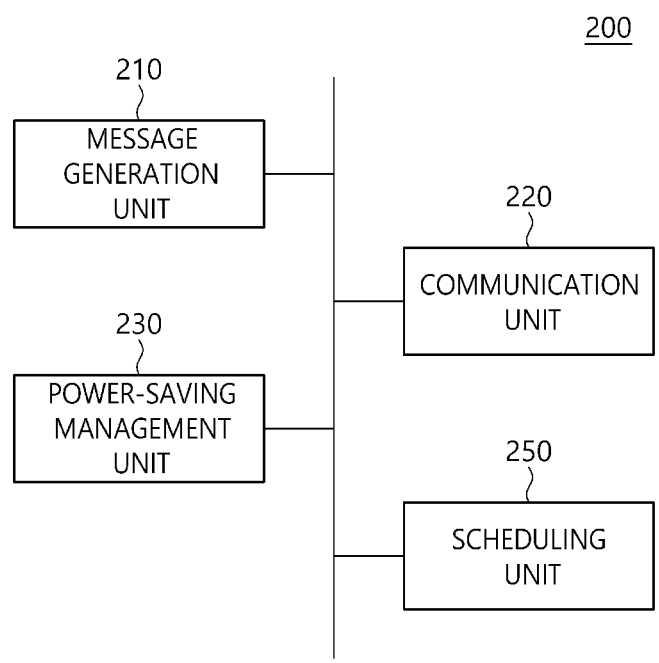
FIG. 2 is a block diagram that shows the configuration of an IoT device in a multi-MAC-operating environment according to an embodiment of the present invention.

FIG. 2 is a block diagram that shows the configuration of an IoT device in a multi-MAC-operating environment according to an embodiment of the present invention.

As illustrated in FIG. 2, the IoT device 200 may include at least one of a message generation unit 210, a communication unit 220, a power-saving management unit 230, and a scheduling unit 240.

First, the message generation unit 210 generates a message that includes at least one of a first message to be transmitted to a first device and a second message to be transmitted to a second device. Here, the first device is the upper-level node of the IoT device 200, and may be the upper-level node 100 shown in FIG. 1. The second device is the lower-level node of the IoT device 200, and may be the lower-level node 300 shown in FIG. 1.

The communication unit 220 transmits the first message to the first device through synchronous MAC when the message generation unit 210 generates the first message. In contrast, when the message generation unit 210 generates a second message, the communication unit 220 transmits the second message to the second device through asynchronous MAC.

Before it transmits the second message, the communication unit 220 transmits a preamble packet to the second device, and may then transmit the second message to the second device at the time corresponding to the transmitted preamble packet.

The power-saving management unit 230 may enable the IoT device 200 to enter a sleep mode after transmission of the first message and to maintain the sleep mode for a preset period, or may set either the sleep mode or a wakeup mode based on multi-MAC-scheduling information.

The scheduling unit 240 manages multi-MAC-scheduling information for message transmission, so that the communication unit 220 performs communication based on the multiple-MAC-scheduling information.

Here, the multi-MAC-scheduling information specifies timeslots and frequency channels to be used for message transmission. The communication unit 220 may transmit a message in the corresponding timeslot using the corresponding frequency channel based on the multi-MAC-scheduling information. Also, based on the multi-MAC-scheduling information, the power-saving management unit 230 may enable the IoT device 200 to enter a sleep mode or to wake up.

Figure 3:
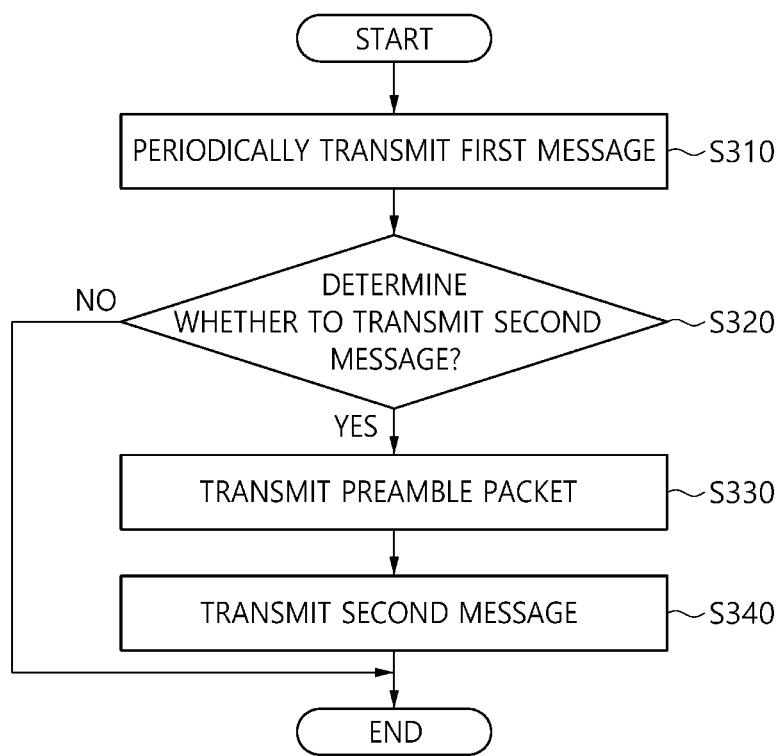
FIG. 3 is a flowchart for explaining a communication method in a multi-MAC-operating environment according to an embodiment of the present invention.
Figure 4:
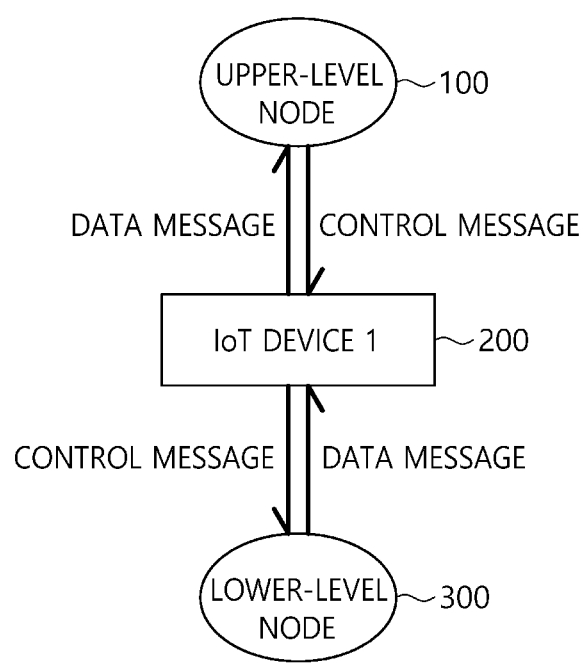
FIG. 4 is a view for explaining communication between an IoT device and the parent or lower-level node thereof according to an embodiment of the present invention.

FIG. 3 is a flowchart for explaining a communication method in a multi-MAC-operating environment according to an embodiment of the present invention, and FIG. 4 is a view for explaining communication between the IoT device and the upper-level node or lower-level node thereof according to an embodiment of the present invention.

The IoT device 200 periodically transmits a first message to a first device, which is the upper-level node 100 thereof, at step S310.

When the upper-level node 100 of the IoT device 200 is present, the IoT device 200 may transmit the first message, which is a data message, to the first device, which is the upper-level node thereof, at a preset period.

Here, the IoT device 200 may transmit the first message using a synchronous MAC protocol. Particularly, after clocks between the IoT device 200, which is the sender of the first message, and the first device, which is the receiver of the first message, are synchronized, the IoT device 200 may transmit the first message to the first device at the appointed time.

After it transmits the first message, the IoT device 200 enters a sleep mode, thereby minimizing energy consumption. That is, the IoT device 200 sleeps (turns off a radio), except for a time section in which it transmits the first message, thereby minimizing a duty cycle.

Also, when it intends to transmit the second message to the second device, which is the lower-level node 300 thereof (Yes at step S320), the IoT device 200 transmits a preamble packet to the second device at step S330. Then, the IoT device 200 transmits the second message at the time corresponding to the preamble packet at step S340.

Here, when the lower-level node 300 of the IoT device 200 is present and when the generated message is the message to be transmitted to the second device, which is the lower-level node 300 of the IoT device 200, the IoT device 200 may transmit the preamble packet to the second device.

The IoT device 200 may transmit the second message using an asynchronous MAC protocol. Unlike a synchronous MAC protocol, the asynchronous MAC protocol does not require scheduling negotiation between a sender and a receiver.

The asynchronous MAC protocol is configured such that, when a sender transmits a preamble packet to a receiver, the receiver, which periodically samples a channel for a short time, receives the preamble packet and prepares to receive a message. Then, when the second device completes preparation to receive a message, the IoT device 200 transmits the second message, which is a control message, to the second device.

Here, the preamble packet may include information about wakeup timing. The second device, which is the receiver of the preamble packet, maintains the sleep mode (the radio-off state) from the time at which it receives the preamble packet to the time corresponding to the wakeup timing, and then wakes up at the time corresponding to the wakeup timing, thereby receiving the second message transmitted from the IoT device 200.

As described above, the IoT device according to an embodiment of the present invention separates a data message to transmit to the first device, which is the upper-level node 100 thereof, from a control message to transmit to the second device, which is the lower-level node 300 thereof, and transmits the data message and the control message using synchronous MAC and asynchronous MAC, respectively. Accordingly, the number of packet collisions may be minimized, whereby the success rate of data transmission may be maximized. Also, energy consumption may be minimized.

Hereinafter, a communication process in a multi-MAC-operating environment according to an embodiment of the present invention will be described in detail with reference to FIGS. 5 to 10.

FIGS. 5 to 10 show an example in which a multi-MAC-operating environment is applied to a system for acquiring data from an IoT device and monitoring the same in the IoT environment. Here, upper-level nodes may periodically receive data messages from lower-level nodes and transmit control messages to the lower-level nodes by the on-demand scheme.

Here, the control message may include information about at least one of the configuration and management of topology, routing control, data exchange scheduling, time synchronization, and a network join, and may be transmitted to the lower-level nodes in an aperiodic manner when necessary.

In consideration of such a communication pattern in the IoT environment, the communication method in the multi-MAC-operating environment according to an embodiment of the present invention may be configured such that synchronous MAC is used to transmit and receive data messages and such that asynchronous MAC is used to transmit and receive control messages. Accordingly, energy consumption may be minimized, and the number of packet collisions may be minimized, whereby the success rate of data transmission may be maximized.

Figure 5:
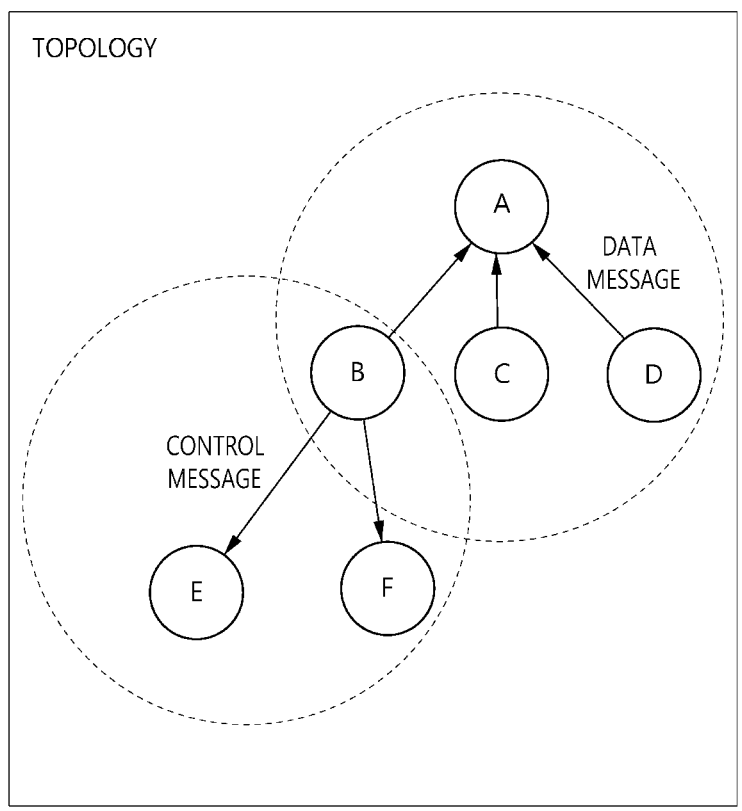
FIG. 5 is an exemplary view that shows the topology of IoT devices included in a multi-MAC-operating environment according to an embodiment of the present invention.
Figure 6:
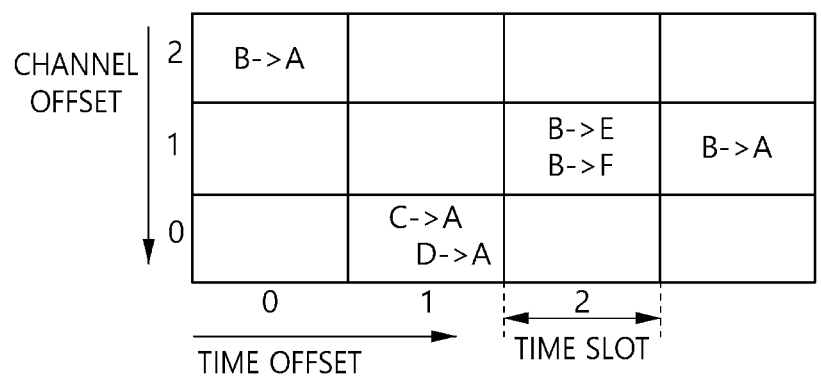
FIG. 6 is an exemplary view for explaining multi-MAC scheduling according to an embodiment of the present invention.

FIG. 5 is an exemplary view that shows topology of IoT devices included in the multi-MAC-operating environment according to an embodiment of the present invention, and FIG. 6 is an exemplary view for explaining multi-MAC scheduling according to an embodiment of the present invention.

As shown in FIG. 5, assume that node B, node C and node D are included as the lower-level nodes of node A, and that node E and node F are included as the lower-level nodes of node B. Here, the multi-MAC-operating environment may be an IoT environment, and at least one of nodes A to F may be the IoT device shown in FIG. 2.

The multi-MAC-scheduling information may be represented as shown in FIG. 6.

In the multi-MAC-scheduling information shown in FIG. 6, the horizontal axis indicates timeslots having individual time offsets, in which a message is transmitted, and the vertical axis indicates channels having individual channel offsets, through which a message is transmitted.

In FIG. 5, node B may periodically transmit a data message to node A, which is the upper-level node thereof, and may transmit a control message to node E and node F, which are the lower-level nodes thereof.

As illustrated in FIG. 6, the data message, which node B transmits to node A, which is the upper-level node of node B, is allocated the timeslots 0, 3, 6, . . . , in a periodic manner, whereby the data message may be transmitted through synchronous MAC. Here, the offset numbers of the allocated frequency channels may be 2, 1, 0, . . . based on a channel-hopping sequence.

Also, as shown in FIG. 6, node C and node D may transmit data messages to node A, which is the upper-level node thereof, in which case the timeslot 1 and the channel corresponding to the channel offset 0 are allocated in order to transmit the data messages to node A.

Here, because the same timeslot and the same channel are shared in order to transmit the data message of node C and the data message of node D, a packet collision may occur. In this case, based on a CSMA/CA back-off algorithm, any one of the packets is transmitted after a short time delay, whereby both node C and node D may transmit packets successfully. In FIG. 6, node C transmits the packet (data message) to node A first, and after a short time delay, node D transmits the packet (data message) to node A.

Also, in FIG. 6, for the schedule based on which node B transmits control messages to node E and node F, which are the lower-level nodes thereof, the timeslot 2 and the frequency channel 1 are allocated. That is, when node B transmits control messages to node E and node F, the timeslot 2 and the frequency channel 1 are allocated for the control messages, and the control message may be transmitted through asynchronous MAC. Here, when node B transmits the same control message to node E and node F, node B may broadcast the control message so as to be simultaneously transmitted.

Figure 7:
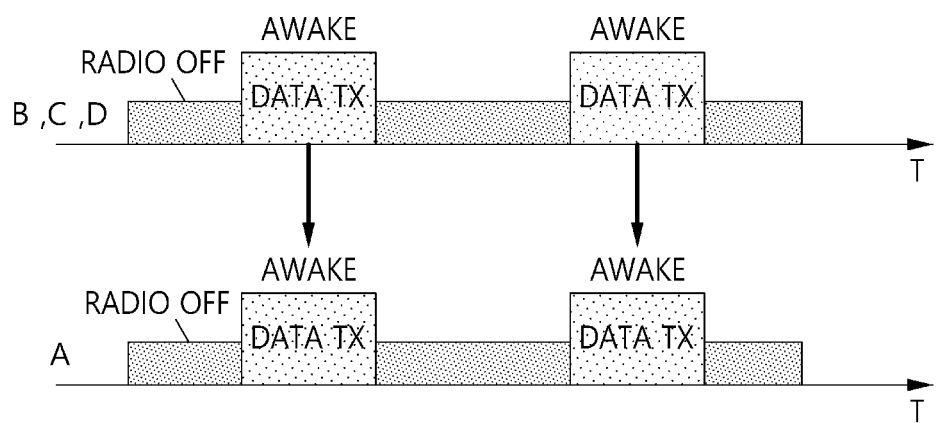
FIG. 7 is a view for explaining a data message transmission method using synchronous MAC according to an embodiment of the present invention.
Figure 8:
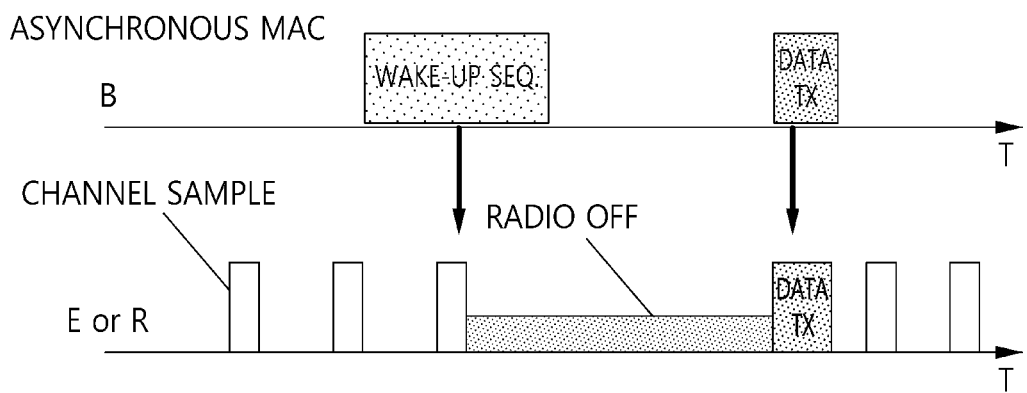
FIG. 8 is a view for explaining a control message transmission method using asynchronous MAC according to an embodiment of the present invention.

FIG. 7 is a view for explaining a data message transmission method using synchronous MAC according to an embodiment of the present invention, and FIG. 8 is a view for explaining a control message transmission method using asynchronous MAC according to an embodiment of the present invention.

As illustrated in FIG. 7, synchronous MAC is configured such that node B, node C and node D, which are lower-level nodes transmitting data messages, and node A, which receives the data messages, synchronize time, and then the data messages are transmitted and received at the appointed time.

Here, nodes A, B, C and D may sleep (turn off a radio), excluding a time section in which they transmit and receive data messages, whereby a duty cycle may be minimized. Here, the duty cycle may be minimized by effectively scheduling the time at which the node wakes up along with neighboring nodes and the time at which the node enters a sleep mode.

As opposed to synchronous MAC, asynchronous MAC does not require special scheduling between an upper-level node, which is a sender, and a lower-level node, which is a receiver.

As shown in FIG. 8, when node B, which is an upper-level node, intends to transmit a control message to node E or node F, which is a lower-level node thereof, node B may transmit a preamble packet to node E or node F in order to wake up node E or node F, which is in a sleep state.

Node E or node F, which periodically samples a channel, receives the preamble packet, thereby recognizing that a control message is to be transmitted and preparing to receive the control message. Here, the preamble packet may include wakeup timing information (a wakeup sequence), which is information about the time at which the lower-level node wakes up and receives control data. Node E or node F, having received the preamble packet, may wake up at the time corresponding to the wakeup timing information and receive the control data transmitted from node B.

As described above, asynchronous MAC may minimize a duty cycle in such a way that an upper-level node, which is a sender, transmits a preamble packet including wakeup timing information to a lower-level node.

The communication method in the multi-MAC-operating environment according to an embodiment of the present invention simultaneously operates synchronous MAC and asynchronous MAC. Specifically, synchronous MAC may be used when data messages are transmitted and received, and asynchronous MAC may be used when control messages are transmitted and received.

Figure 9:
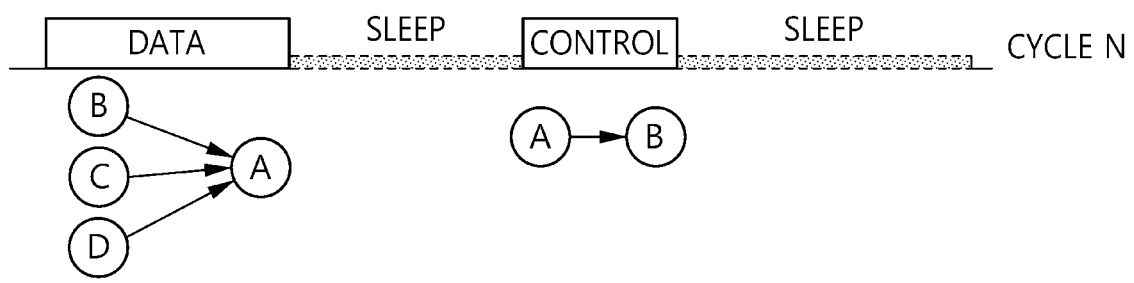
FIG. 9 is an exemplary view that shows a message transmission schedule in the first cycle according to an embodiment of the present invention.
Figure 10:
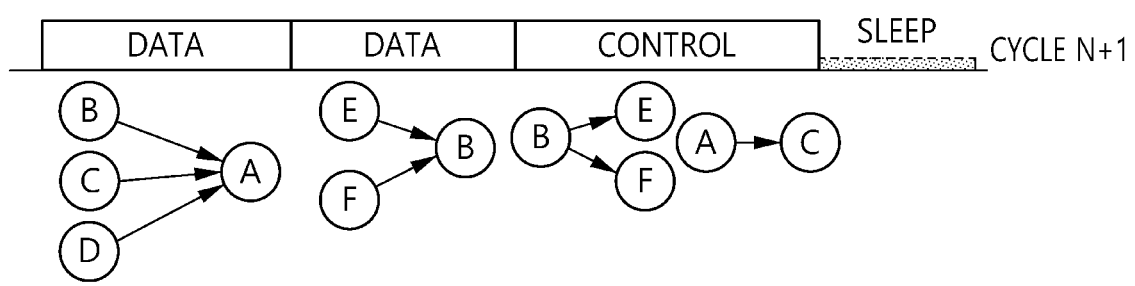
FIG. 10 is an exemplary view that shows a message transmission schedule in the second cycle according to an embodiment of the present invention.

FIG. 9 is an exemplary view that shows a message transmission schedule in the first cycle according to an embodiment of the present invention, and FIG. 10 is an exemplary view that shows a message transmission schedule in the second cycle according to an embodiment of the present invention.

As shown in FIG. 9, assume that, in the first cycle (cycle N), node B, node C and node D, which are lower-level nodes, transmit data messages to node A, which is the upper-level node thereof, a sleep duration passes, and node A transmits a control message to node B. Here, when the data messages are transmitted, synchronous MAC is used, and when the control message is transmitted, asynchronous MAC is used.

The communication method in the multi-MAC operating environment according to an embodiment of the resent invention uses a multi-MAC-scheduling method that includes synchronous MAC and asynchronous MAC, thereby separately transmitting a control message and a data message. Accordingly, collisions may be completely avoided, and the success rate of data transmission may be maximized.

The multi-MAC-scheduling method is configured such that nodes enter a sleep mode other than when the nodes periodically transmit data messages, whereby a duty cycle may be minimized and energy efficiency may be maximized.

In the case of control message transmission, the multi-MAC-scheduling method is configured such that an upper-level node, which is a sender, transmits the control message to a lower-level node thereof, which is a receiver by the on-demand scheme without special scheduling negotiation. Here, because the nodes maintain a sleep state excluding the period during which the control message is transmitted and received, energy consumption may be minimized.

FIG. 10 shows scheduling in which, in the second cycle (cycle N+1), node E and node F, which are lower-level nodes, transmit data messages to node B, which is the upper-level node thereof, node B transmits control messages to node E and node F, and node A, which is an upper-level node, transmits a control message to node C, which is a lower-level node thereof.

Here, the length of the period during which the data message is transmitted and the length of the period during which the control message is transmitted may vary depending on the type of application service. Also, the sequence in which the data message transmission section and the control message transmission section are arranged, the timing of data message transmission, and the timing of control message transmission may be changed depending on at least one of network traffic, the type of application service, and which message transmission method is used, among unicast, broadcast, and multicast.

Figure 11:
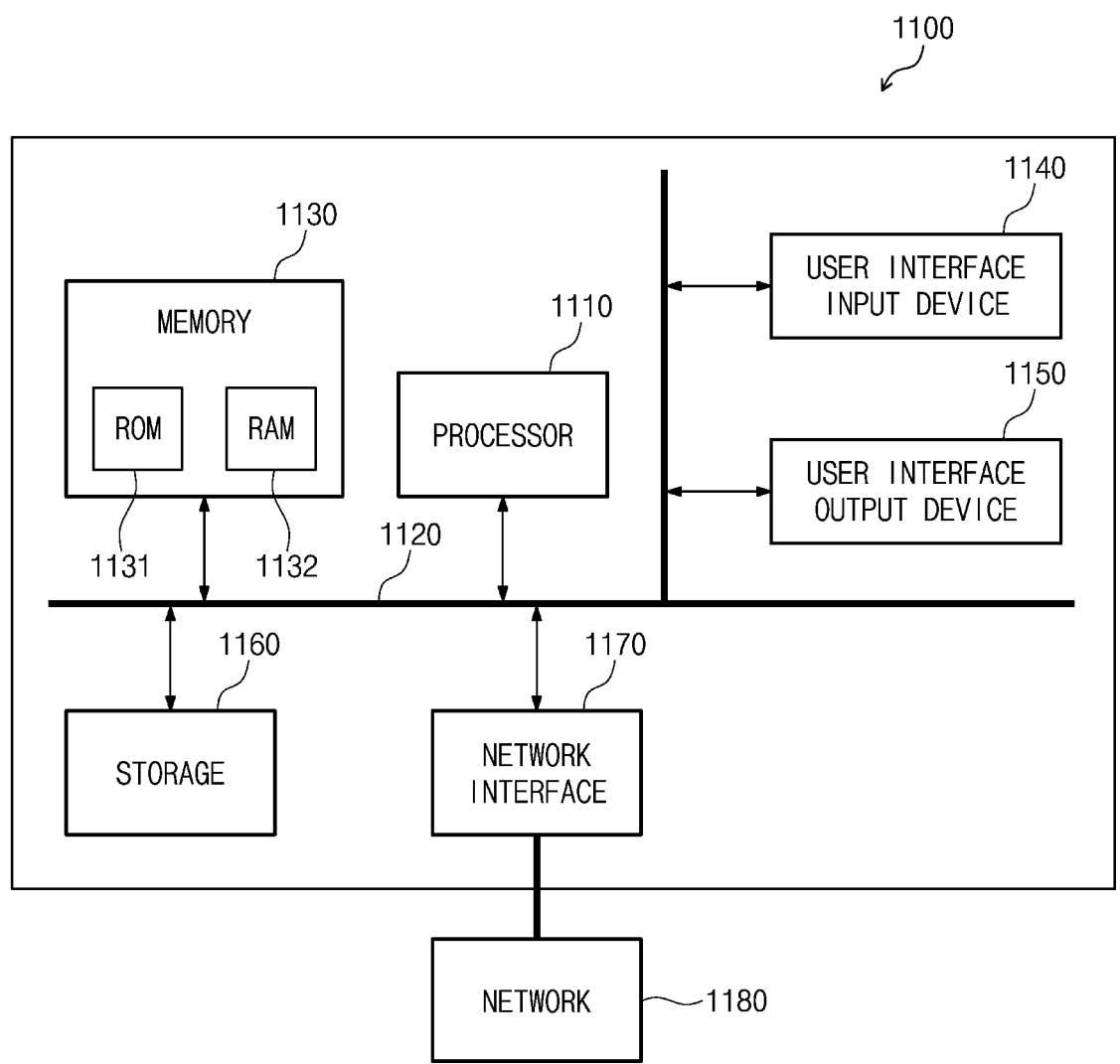
FIG. 11 is a block diagram that shows a computer system according to an embodiment of the present invention.

FIG. 11 is a block diagram that shows a computer system according to an embodiment of the present invention.

Referring to FIG. 11, an embodiment of the present invention may be implemented in a computer system 1100 including a computer-readable recording medium. As shown in FIG. 11, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, packet collisions and interference may be avoided in a large-scale IoT environment, and various QoS requirements of industrial IoT may be satisfied.

Also, according to the present invention, there may be provided multi-MAC-operating technology, which may prevent packet collisions and minimize a duty cycle.

Also, according to the present invention, control messages and data messages may be separately transmitted through simultaneous operation of synchronous MAC and asynchronous MAC, whereby packet collisions may be completely prevented, and the success rate of data transmission may be maximized.

Also, according to the present invention, a sleep mode is maintained, excluding a time section in which data is transmitted, whereby a duty cycle may be minimized and energy efficiency may be maximized.

Also, according to the present invention, a control message is transmitted by an on-demand scheme without any scheduling negotiation, and a sleep mode is maintained, excluding a time section in which a control message is transmitted, whereby interference-free communication scheduling may be performed and energy consumption may be reduced.

As described above, the communication method and the IoT device in a multi-MAC-operating environment according to the present invention are not limitedly applied to the configurations and operations of the above-described embodiments, but all or some of the embodiments may be selectively combined and configured, so that the embodiments may be modified in various ways.

What is claimed is:

1. A communication method in a multi-MAC (Media Access Control)-operating environment including synchronous MAC and asynchronous MAC, the communication method comprising:
   periodically transmitting, by an IoT (Internet of Things) device included in the multi-MAC-operating environment, a first message to a first device;
   determining, by the IoT device, whether to transmit a second message;
   transmitting, by the IoT device, a preamble packet to a second device, to which the second message is to be transmitted, when the second message is determined to be transmitted; and
   transmitting, by the IoT device, the second message to the second device,
   wherein the periodically transmitting the first message includes transmitting, by the IoT device, the first message to the first device, which is a upper-level node of the IoT device, using a synchronous MAC protocol.

2. The communication method of claim 1, wherein the periodically transmitting the first message includes transmitting the first message, which is a data message, to the first device using the synchronous MAC protocol.

3. The communication method of claim 1, wherein the IoT device enters a sleep mode after the transmitting the first message using the synchronous MAC protocol.

4. The communication method of claim 1, wherein the IoT device transmits a message, including at least one of the first message and the second message, based on multi-MAC-scheduling information in which at least one of a timeslot or a frequency channel is specified.

5. The communication method of claim 4, wherein, in an event of a packet collision between a message transmitted by the IoT device and a message transmitted by a neighboring IoT device, which shares the timeslot and the frequency channel with the IoT device, at least one of the message transmitted by the IoT device and the message transmitted by the neighboring IoT device is transmitted after a time delay.

6. The communication method of claim 1, further comprising:
   receiving, by the IoT device, a control message from the first device using an asynchronous MAC protocol.

7. The communication method of claim 6, wherein the receiving the control message includes:
   receiving, by the IoT device, a preamble packet from the first device;
   changing, by the IoT device, to a wakeup mode at a time corresponding to the preamble packet; and
   receiving, by the IoT device, the control message in the wakeup mode.

8. The communication method of claim 7, wherein the changing to the wakeup mode includes maintaining a sleep mode until wakeup timing corresponding to the preamble packet and to change to the wakeup mode at the wakeup timing.

9. The communication method of claim 1, further comprising:
   periodically receiving, by the IoT device, a data message from the second device using a synchronous MAC protocol.

10. A communication method in a multi-MAC (Media Access Control)-operating environment including synchronous MAC and asynchronous MAC, the communication method comprising:
    periodically transmitting, by an IoT (Internet of Things) device included in the multi-MAC-operating environment, a first message to a first device;
    determining, by the IoT device, whether to transmit a second message;
    transmitting, by the IoT device, a preamble packet to a second device, to which the second message is to be transmitted, when the second message is determined to be transmitted; and
    transmitting, by the IoT device, the second message to the second device,
    wherein the transmitting the second message includes transmitting, by the IoT device, the second message to the second device, which is a lower-level node of the IoT device, using an asynchronous MAC protocol.

11. The communication method of claim 10, wherein the transmitting the second message includes transmitting the second message, which is a control message, to the second device using the asynchronous MAC protocol.

12. The communication method of claim 10, wherein the transmitting the preamble packet to the second device includes transmitting the preamble packet to the second device, which periodically samples a channel,
    wherein the preamble packet includes information about wakeup timing of the second device.

13. The communication method of claim 12, wherein the transmitting the second message includes transmitting the second message to the second device at a time corresponding to the wakeup timing.

14. An IoT (Internet of Things) device for performing communication in a multi-MAC (Media Access Control)-operating environment, including synchronous MAC and asynchronous MAC, the IoT device comprising:
    at least one processor; and
    a memory having instructions stored thereon, which, when executed by the at least one processor, cause the at least on processor to perform:
    a message generation unit configured to generate a message, including at least one of a first message to be transmitted to a first device and a second message to be transmitted to a second device; and
    a communication unit configured to transmit the first message to the first device using a synchronous MAC protocol when the generated message is the first message, and to transmit the second message to the second device using an asynchronous MAC protocol when the generated message is the second message.

15. The IoT device of claim 14, wherein the first message, which is transmitted using the synchronous MAC protocol, is a data message, and the second message, which is transmitted using the asynchronous MAC protocol, is a control message.

16. The IoT device of claim 15, wherein the at least one processor is caused to perform:
    a power-saving management unit configured to enter a sleep mode after transmission of the first message and maintaining the sleep mode during a preset period.

17. The IoT device of claim 16, wherein the at least one processor is caused to perform:
    a scheduling unit configured to manage multi-MAC-scheduling information for transmitting the message,
    wherein the power-saving management unit sets the sleep mode or a wakeup mode based on the multi-MAC-scheduling information.

18. The IoT device of claim 15, wherein, when the generated message is the second message, the communication unit transmits a preamble packet to the second device and transmits the second message to the second device at a time corresponding to the preamble packet.

19. The IoT device of claim 18, wherein, after reception of the preamble packet, the second device maintains a sleep mode for a time period corresponding to the preamble packet and then receives the second message.

\* \* \* \* \*